United States Patent [19]

Graham

[11] 4,330,337

[45] May 18, 1982

[54] GLASS FIBERS WITH IMPROVED DISPERSIBILITY IN AQUEOUS SOLUTIONS AND SIZING COMPOSITION AND PROCESS FOR MAKING SAME

[75] Inventor: Roy R. Graham, Lexington, N.C.

[73] Assignee: PPG Industries, Inc., Pittsburgh, Pa.

[21] Appl. No.: 131,580

[22] Filed: Mar. 19, 1980

[51] Int. Cl.$^3$ .......................... C08K 5/17; C08L 3/02; C08L 29/04; C08L 89/00

[52] U.S. Cl. .................................. 106/135; 106/213; 106/287.24; 106/287.3

[58] Field of Search ............... 260/29.6 B; 106/213, 106/135, 287.29, 287.23, 287.24, 126, 130, 287.3

[56] References Cited

U.S. PATENT DOCUMENTS

| | | |
|---|---|---|
| 2,702,241 | 2/1955 | Hawley et al. . |
| 2,723,971 | 11/1955 | Cupery . |
| 2,789,903 | 4/1957 | Lukman . |
| 2,802,734 | 8/1957 | Bandel et al. . |
| 2,919,221 | 12/1959 | Labino ................... 162/156 |
| 2,962,414 | 11/1960 | Arledter ................. 162/145 |
| 2,970,979 | 1/1961 | Klacsmann ............. 162/164 |
| 3,016,325 | 1/1962 | Pattilloch ............... 162/164 |
| 3,066,066 | 11/1962 | Keim et al. . |
| 3,180,836 | 2/1965 | Jursich . |
| 3,410,828 | 11/1968 | Kekish . |
| 3,424,608 | 1/1969 | Marzocchi et al. . |
| 3,556,754 | 1/1971 | Marsden et al. . |
| 3,586,639 | 6/1971 | House . |
| 3,600,272 | 8/1971 | Cortigene et al. . |
| 3,622,528 | 11/1971 | Longoria . |
| 3,692,885 | 9/1972 | Anello et al. . |
| 3,749,638 | 7/1973 | Renaud et al. ................ 162/145 |
| 3,932,193 | 1/1976 | Graham ....................... 106/213 |
| 4,052,256 | 10/1977 | Renaud et al. ............... 162/145 |
| 4,233,046 | 11/1980 | Walser ......................... 106/213 |

*Primary Examiner*—Allan Lieberman
*Attorney, Agent, or Firm*—Kenneth J. Stachel

[57] ABSTRACT

In order to obtain a more uniform sheet-like glass fiber product, it has been discovered that the use of a treating formulation having phosphate esters of polyoxyalkylene alkyl alcohol, polyamine compound, organic acid with glass fibers gives a more uniform aqueous dispersion of glass fibers. The treating formulation can be added to the aqueous solution to which the glass fibers are to be dispersed and then the more uniform aqueous dispersion of glass fibers is conveyed to a separator to produce the more uniform sheet-like glass fiber product from the aqueous dispersion and the aqueous dispersion is recycled to disperse fresh glass fibers. Also, the treating formulation can be present by itself on glass fibers that are in a wet condition. In addition, the treating formulation can be present on glass fibers that are in a dry condition when the treating formulation is applied to the glass fibers from a sizing composition containing the treating formulation and a film-former.

15 Claims, No Drawings

GLASS FIBERS WITH IMPROVED DISPERSIBILITY IN AQUEOUS SOLUTIONS AND SIZING COMPOSITION AND PROCESS FOR MAKING SAME

BACKGROUND OF THE INVENTION

The present invention is directed to a treating composition, treated glass fibers and process for producing an improved dispersion of glass fibers in aqueous solution.

More particularly, the present invention is directed to treated glass fibers having improved dispersibility in aqueous solutions, sizing composition for treating glass fibers, and process for producing an improved dispersion of glass fibers in aqueous solution, and a more uniform, sheet-like, glass fiber product.

Glass fibers have been used in combination with other types of fibers or alone in the production of paper-like sheet materials. Glass fibers have been used as a supplemental fiber in specialty synthetic fiberwood pulp composite papers. It has also been recognized that small diameter glass fibers can be used to produce paper-like sheet material that has a high strength and can be used as air or liquid filtration papers. With the growing concern of possible health hazards associated with asbestos fibers, the use of glass fibers as a replacement for asbestos fibers in producing sheet-like material is being investigated.

The glass fibers differ from natural cellulose fibers or asbestos fibers in that the glass fibers are more difficult to disperse in water and they do not fibrillate in the usual paper-making sense. The dispersion problem occurs when a slush, an aqueous suspension of dispersed fibers, of the glass fibers or the combination of glass fibers and cellulose fibers is prepared as a preliminary step to the formation of a wet web. The dispersion problem of glass fibers is caused by several factors including the length of the fibers, the electrical charges on the fibers, the diameter of the fibers, the differing water absorption characteristics, and the presence of textile sizes or finishes on the glass fibers. When the glass fibers have a small diameter, i.e., a micro fiber with a diameter up to around 6.4 microns, the glass fibers produced without a sizing composition, or with a sizing composition that can be easily removed, or with a sizing composition containing a water-dispersible starch binder have found some utility. When the diameter of the glass fibers increases above the micro size, the problem of poor dispersibility becomes increasingly significant.

The art in trying to improve the dispersibility of glass fibers has employed the use of additional chemicals that may be anionic, cationic or nonionic depending upon the nature of the fiber and may be supplied as a finish on the fiber or added separately to the aqueous system. For example, the art discovered that an acid pH obtained by the addition of strong mineral acids or sodium hexametaphosphate was useful in dispersing glass fibers (U.S. Pat. Nos. 3,749,638 and 2,919,221). Also the art has shown that polyacids, like phosphoric, and carboxy methyl cellulose, can be used as dispersing aids (U.S. Pat. No. 2,802,734). In addition, the art has shown that linear polysiloxanes containing at least 6 silicon atoms with each atom having 2 non-hydrolyzable olephilic groups can be used to disperse glass fibers (U.S. Pat. No. 4,052,256). The use of these additional chemical agents may be useful in dispersing micro size glass fibers. There is a need in the art for a sizing composition for glass fibers that renders the protection needed for glass fibers against further processing while at the same time does not interfere with but actually assists in dispersing glass fibers in an aqueous solution. Also, there is a need in the art for glass fibers in any form and in diameters larger than micro-diameters that have better dispersibility in aqueous solutions to form a more uniform sheet-like, glass fiber product.

It is an object of the present invention to provide a sizing composition for glass fibers that yields sized glass fibers with improved dispersibility in aqueous solutions.

SUMMARY OF THE INVENTION

The aforementioned objects and other inherent objects of the invention are achieved by having treated glass fibers treated with an aqueous solution having: a major amount of mono and diphosphate esters of polyoxyethylene alkyl alcohol, and a minor amount of an aliphatic polyamine compound, and a small amount of an organic acid.

When the glass fibers are in the form of wet-chopped, glass fibers they may be treated during forming with the aforementioned aqueous solution. When the glass fibers are in the form of continuous glass fiber strands or continuous fibers, or chopped glass fibers or strands, the glass fibers are treated during formation of the glass fibers with the aforementioned aqueous solution and in addition other sizing agents such as lubricants and film-forming agents may be present in the aqueous solution along with the mono and diphosphate esters of the alcohol and the polyamine compound and the organic acid. The application of the aqueous solution alone or with the film-former to the glass fibers during formation occurs in the conventional manner to produce treated wet chopped glass fibers or treated glass fibers in the form of strands.

The treated glass fibers either in a wet or dry condition are added to an aqueous solution to produce an aqueous dispersion of glass fibers. From this dispersion, the glass fibers are arranged to form a uniform sheet-like glass fiber product. The mixture of the major amount of mono or diphosphate ester of polyoxyethylene alkyl alcohol and minor amount of aliphatic polyamine compound and small amount of organic acid mixture can be used in a manner where rather than treating the glass fibers during forming with the mixture, the mixture is added to the aqueous solution that in addition to the glass fibers will constitute the aqueous dispersion of glass fibers. This method involves adding the mixture to the aqueous solution before the glass fibers are added to the aqueous solution, then adding the glass fibers to the aqueous solution containing the mixture, conveying the aqueous dispersion of glass fibers to an apparatus to separate the glass fibers from the aqueous solution, and recycling the aqueous solution to be contacted with more glass fibers.

The broadest aspect of the present invention involves using the mixture of a major amount of mono and diphosphate esters of polyoxyethylene alkyl alcohol and a minor amount of aliphatic polyamine compound and a small amount of organic acid in connection with glass fibers to be dispersed in an aqueous solution. The present invention allows for a better dispersion of the glass fibers in the aqueous solution and the production of a more uniform sheet-like fiber glass product. The invention involves using the mixture directly on the glass fibers either alone when the glass fibers are in a wet condition or in a sizing composition with at least a film-former when the glass fibers are in a dry condition, or in an indirect manner where the mixture is added to the aqueous solution that is to be the aqueous dispersion containing the glass fibers before the addition of the glass fibers.

DETAILED DESCRIPTION OF THE INVENTION

It is believed, but the present invention is not restricted by this belief, that the problem of dispersing glass fibers with diameters larger than micro diameters is that once the glass fibers are dispersed in water they tend to reagglomerate. The mixture of a major amount of mono and diphosphate esters of polyoxyethylene alkyl alcohol and minor amount of aliphatic polyamine compound and small amount of organic acid retard the reagglomeration tendency of the glass fibers in aqueous solutions. This retarding effect is obtained whether the mixture is added to the aqueous solution before the addition of the glass fibers or is present on the glass fibers, when the glass fibers are in a wet condition or dry condition. The retardation effect is not obtained when the mixture is added to the aqueous solution after the glass fibers since the mixture cannot be dispersed through the aqueous solution before the glass fibers start to reagglomerate.

The mixture used in the present invention has a major amount of mono and diphosphate esters of polyoxyethylene alkyl alcohol. The major amount is an amount greater than about 45 percent by weight of the mixture on a non-aqueous basis. The ratio of mono to diphosphate esters of the polyoxyethylene alkyl alcohol may be any ratio that is obtained in the production of such a material. Generally, the mono and diphosphate esters of polyoxyethylene alkyl alcohol is a phosphoric acid mono or diester of an ethylene oxide adduct or of a fatty alcohol or an alkali metal salt thereof. The phosphoric acid mono or diester of the ethylene oxide adduct or alkali metal salt is selected from one member of the group consisting of a $C_8$ to $C_{18}$ linear alkyl alcohols. Non-exclusive examples of such organic phosphate esters and alkali metal salts thereof are the following compounds:

polyoxyethylene (POE) (3) octyl potassium phosphate, POE (2) decyl potassium phosphate POE (4) lauryl potassium phosphate, POE (5) octyl potassium phosphate, POE (5) decyl potassium phosphate, POE (5) lauryl potassium phosphate, POE (5) myristyl potassium phosphate, POE (5) cetyl potassium phosphate, POE (5) stearyl potassium phosphate, POE (10) octyl potassium phosphate, POE (12) decyl potassium phosphate, POE (16) lauryl potassium phosphate, POE (18) stearyl potassium phosphate, POE (20) octyl potassium phosphate, POE (25) cetyl potassium phosphate, POE (6) decyl potassium phosphate and the mono and diphosphate esters of the fatty alcohols of the aforementioned compounds.

The polyamines that can be used in the mixture include diamines, triamines, tetramines, pentamines, hexamines and the like. The diamines which may be employed have the general formula:

$$H_2N-(CH_2)_n-NH_2$$

wherein n is an integer from about 2 to 10 such as ethylene diamine, propylene diamine, tetramethylenediamine, pentamethylenediamine, hexamethylenediamine, decamethylenediamine, and the like. Other unmodified aliphatic polyamines that can be used include diethylene triamine and triethylene tetramine, and tetraethylene pentamine and the like. Other aliphatic polyamines having at least three active amine hydrogen atoms per molecule that can be used including amines such as polyalkylene polyamines, for example, diethylene/triamine, triethylene/tetramine, tetraethylene/pentamine and pentaethylene/hexamine. Additional useful amines are ethylene diamine, tetramethylene diamine, hexamethylene diamine, zylylene diamine and the like. Adducts of such amines with acrylonitrile, acrylic acid, ethyl acrylate, and the like are also useful if the adduct contains at least three active amine hydrogen atoms. Also included as useful amines are amido-amines obtained by reacting polyamines with fatty acids, both monomers and dimers, provided; of course, that the resulting amido amine contains at least three active amine hydrogen atoms per molecule. The minor amount of the aliphatic polyamine used in the mixture is in the range of about 5 to about 45 weight percent of the mixture on a non-aqueous basis.

The mixture also includes a small amount of an organic acid. The organic acids useful in the mixture are acetic acid, formic acid, propionic acid, lactic acid, monochloracetic acid, pyruvic acid and the like. The small amount of the organic acid is usually in the range of about 1 to about 20 weight percent of the mixture.

In a process for producing glass fibers formed by being drawn from molten cones of glass located at the tips of small orifices in a bushing, where the glass fibers are chopped after being drawn while they are still in a wet condition, the mixture of the present invention in aqueous solution need be the only treatment for the glass fibers. In this operation, the effective amount of the mixture in aqueous solution is an amount of about 0.1 to about 1.5 weight percent of the aqueous solution. When the mixture of the phosphate ester of the POE fatty alcohol, polyamine compound and organic acid are used alone to treat the glass fibers, the mixture acts as the binder for the glass fibers. This usage can occur when the glass fibers are chopped while still in a wet condition and do not undergo a large number of additional processing steps. The wet chopped glass fibers can be dried and the dried residue of the mixture on the glass fibers should be in the range of about 0.05 to about 0.30 LOI (loss on ignition).

In a process for producing glass fibers wherein the glass fibers are in the form of glass fiber strands that are composed of the glass fibers that have been formed by being drawn at a high rate of speed from molten cones of glass located at the tips of small orifices in a bushing, the mixture of the phosphate esters of the POE fatty alcohol, polyamine compound and organic acid mixture would be used in a sizing composition having present at least a film-former. The sizing composition can also have present a lubricant. This sizing composition is applied to the glass fiber strands by drawing the glass fibers during formation over an application device for the application of the sizing composition. The sized glass fibers are then gathered and wound onto forming packages. Glass fiber strands from a plurality of forming packages are mounted on a creel and the strands are unwound and combined in parallel and chopped to produce chopped strand or the plurality of glass fiber strands can be wound onto a tubular support to produce a roving. The glass fiber roving can then be mechanically chopped to produce the chopped glass fiber strand useful for addition to an aqueous solution to form an aqueous dispersion of glass fibers for the production of sheet-like, glass fiber product.

Film-formers that are useful in a sizing composition along with the mixture of phosphate esters of POE fatty alcohols, polyamine compounds, and organic acids include at least one starch binder. Suitable starch binders that can be employed in the sizing composition include high amylose-containing corn starch binders, low amylose-containing corn starch binders and high amylose-containing derivatized or cross-linked starch binders or cationic starch binders with a normal amylose content. The starch sources include corn, wheat, potato, tapioca, waxy maze, sago, rice, hybrid starches, etc. A particularly suitable starch binder is available from National Starch and Chemical Corporation under the trade designation "CATO 75" which is a cationic corn starch with a normal amylose content. Other commercially available starches that may be used alone or in combination with one or the other or several starches and/or the "CATO-75" include Miraquik C starch from A. E. Staley Manufacturing Company, which is a hybrid corn starch having an amylose content of around 55 percent by weight and the starch available as "NADEX 339" which is a dextrine corn starch available from National Starch and Chemical Corporation. The amount of starch present in the sizing composition is generally around the amount conventionally used in glass fiber textile sizing composition which is usually an amount in the range of about 1 to about 15 weight percent based on the total sizing composition.

Types of lubricants that can be used in the sizing composition include cationic, nonionic and anionic lubricants that impart lubricity to the glass fiber strand and/or aid in further processing by increasing strand integrity, but that do not add a high degree of hydrophobicity to the glass fiber strand. Non-exclusive examples of such lubricants include cationic lubricants, such as amine salts of fatty acids, lubricating oils containing some aromaticity, such as vegetable oils, and derivatives thereof and polyvinyl alcohol and the like. Examples of cationic lubricants are amine salts of fatty acids where the fatty acids have 4 to 26 carbon atoms and the amines useful for forming the salt of the tertiary amines are of substantially low molecular weight, i.e., the alkyl groups attached to the nitrogen atom should have between 1 and 6 carbon atoms. In addition, cationic lubricants such as salts of polyamide resins available under the product designation "Versamid 140" available from General Mills and the amadated polyamine available under the product designation "Emery 6717" available from Emery Industries, and the alkyl imidazoline reaction product of tetraethylene pentamine stearic acid available under the product designation "Cation X" can be used alone or in combination as the cationic lubricant. Another type of lubricant that can be used is the water soluble lubricants such as polyoxyethylene glycols available under the product designation "Carbowax 300" or "Carbowax 1000" or "PEG 300 or 1000". The amount of the lubricant used in the sizing composition is generally in the range of about 0.1 to about 3, preferably 0.1 to about 1.5, weight percent of the sizing composition on an aqueous basis. An example of a vegetable oil type lubricant that can be used is the product designated "Puerco Oil" available from Capital City Products.

In addition to the film-former and lubricant used in the sizing composition of the present invention, other conventional components of glass fiber sizing compositions can be used as long as the component has some solubility in water, although it is preferred to have as few components in the sizing composition as possible. Examples of such components include gelatin, organo tin bactericide, and the like, well known additives for sizing glass fibers for textile use.

When the sizing composition containing the film-former and lubricants and possibly other aqueous soluble glass fiber size components is used, the amount of the mixture of phosphate esters of POE fatty acid alcohols, polyamine compound and organic acid present in the sizing composition can generally range in an amount of about 0.1 to about 1.5 weight percent of the total aqueous size composition.

Another component in the sizing composition can be a nonionic wetting agent and/or emulsifier such as polyalkylene derivatives of esters, fatty acids, fatty alcohols, fatty amides, alkyl phenyl ethers, and other derivatives. An example of a nonionic wetting agent useful in the sizing composition of the present invention is the polyethylene glycol 600 monolaurate. When present, the nonionic agent or emulsifier compound is in an amount in the range of about 0.05 to about 0.5.

In addition to being used as a treatment for the glass fibers to be dispersed in the aqueous solution to produce a uniform sheet-like fiber glass product, the mixture of phosphate esters of polyoxyethylene fatty alcohols, polyamine compounds and organic acids, can be added to the aqueous solution in which the glass fibers are to be dispersed. When used in this manner it is important that the mixture be added to the aqueous solution before the addition of the glass fibers. The amount of the mixture added to the aqueous solution is in the range of about $5.0 \times 10^{-4}$ to about $1 \times 10^{-2}$ weight percent of the aqueous solution. The glass fibers that are then dispersed in the aqueous solution containing the mixture can be wet chopped, unsized glass fibers, or glass fibers with the sizing composition removed, or chopped glass fiber strands having a sizing composition containing film-formers, lubricants, or other ingredients except for the mixture as discussed above. It is also within the scope of the invention to add a portion of the amount of the mixture to the aqueous solution to be combined with glass fibers having the remaining portion of the mixture placed on the glass fibers alone or in a sizing composition.

Once the mixture of phosphate esters of polyoxyethylene fatty alcohols, polyamine compound and organic acid in aqueous solution is combined with the glass fibers to form an aqueous dispersion of glass fibers, this aqueous dispersion should be subjected to at least mild agitation. The aqueous dispersion of glass fibers is then conveyed to an apparatus for separating the glass fibers from the aqueous solution. Such an apparatus is that used in the paper making industry and referred to as a forming wire of a paper machine. The glass fibers are collected to produce a more uniform sheet-like glass fiber product and the aqueous solution can be returned to disperse additional quantities of glass fibers. When the mixture of phosphate esters of POE fatty alcohols, polyamine compounds and organic acids are added to the aqueous solution in which the glass fibers are to be dispersed, the mixture should be substantially dispersed in the aqueous solution prior to the addition of the glass fibers. Also, the aqueous solution that is removed from the paper making machine after separation of the glass fibers from the solution can be recycled to disperse additional quanitites of glass fibers several times without significant loss in the effectiveness of the mixture. When the mixture is added to the aqueous solution in this manner in the above-mentioned amounts, the amount of glass fibers that can be dispersed in a given amount of aqueous solution is in the range of about 0.5 lbs. of glass fibers per about 100 pounds of water or expressed in percentage of the solution about 0.1 to about 2 weight percent of the aqueous solution. This amount will be diluted on the paper machine to about 0.5 weight percent.

With the use of the mixture of phosphate esters of polyoxyethylene fatty alcohols, polyamine compounds, and organic acids, the glass fibers that can be dispersed in aqueous solutions include glass fibers produced from "E" or "621" glass or low pollution derivatives thereof. The diameter and size of these glass fibers that can be dispersed range from micro diameter to macro diameter glass fibers with diameters in excess of 60.0 to $64.9 \times 10^{-5}$ inches. The mixture is especially useful for glass fibers having filament diameters ranging from B fibers, which has a diameter of $1.47 \times 10^{-4}$ inches, to M fibers, which have a filament diameter of 60.0 to $64.9 \times 10^{-5}$ inches.

PREFERRED EMBODIMENT OF THE INVENTION

In using the mixture of phosphate ester of POE fatty alcohol, polyamine compound and organic acid in the dispersion of glass fibers in aqueous solutions it is preferred to use the mixture in treating the glass fibers. It is also preferred to have the mixture present in a sizing composition that is used to treat the glass fibers during their formation from molten streams of glass from orifices in a bushing, where the sized glass fibers are subsequently dried and chopped. In using the mixture in this manner, but also when the mixture is used in the manner of applying to glass fibers that are to be chopped in a wet condition or is added to an aqueous solution before the addition of the glass fibers, the preferred phosphate ester is a mixture of mono and diphosphate esters of polyoxyethylene (6) decyl alcohol available from Ethox Chemicals, Inc. by the product designation "Ethfac 161". The phosphate of the POE (6) decyl alcohol is present in the mixture in an amount of about 50 to about 70 percent of the mixture. The preferred polyamine compound used in the mixture is tetraethylene pentamine present in an amount of about 15 to about 35 weight percent of the mixture. The preferred organic acid, acetic acid, is present in the mixture in a concentrated form in the range of about 5 to about 20 weight percent of the mixture. This mixture can be obtained commercially from Ethox Chemicals, Inc. under the product designation "Ethox 1369", "Ethox 1567" and "Ethox 1566". The preferred mixture is the "Ethox 1369" with the preferred amine content of about 25 to about 30 percent.

It is also preferred to have present in the sizing composition along with the mixture a film-former, preferably the polyvinyl alcohol available from Monsanto Chemical Corporation, under the product designation "Gelvatol 1-30" in an amount in the range of about 1 to about 10 weight percent of the aqueous sizing composition. Also, it is preferred to have gelatin present in an amount of about 1 to about 5 weight percent of the aqueous sizing composition. It is also preferred to have present in the sizing composition organo tin bactericide in an amount of about 1 to about 5 Milli liters per 10 gallon (37.85 liters) of sizing composition. In a sizing composition it is preferred to have the mixture of mono and diphosphate of POE (6) decyl alcohol, tetraethylene pentamine and acetic acid in an amount of about 0.1 preferably 0.25 to about 1 weight percent of the aqueous sizing composition. The amount of water in the sizing is about 89 to about 99 weight percent when only a film-former is present in addition to the mixture. When additional ingredients like lubricants and additional film-formers are present, the amount of water may be less than this range.

The sizing composition can be used to treat the glass fibers in any conventional manner with any conventional equipment. An example of the manner of applying the sizing composition to glass fibers can be found in U.S. Pat. No. 4,002,445 which is hereby incorporated by reference.

The present invention is further elucidated by the following nonlimiting examples.

TABLE 1

| | Treatment Formulations Formulations in 37.85 liters of H$_2$O | | | | | | | | |
|---|---|---|---|---|---|---|---|---|---|
| Components | 1 gm/wt % | 2 gm/wt % | 3 gm/wt % | 4 gm/wt % | 5 gm/wt % | 6 gm/wt % | 7 gm/wt % | 8 gm/wt % | 9 gm/wt % |
| Mixture | | | | | | | | | |
| A. Mixture of mono and diphosphate esters of polyoxyethylene (L) decyl alcohol (available from Ethox Chemical Inc. as "Ethfac 161" | | | | | | | | | |
| B. tetraethylenepentamine | | | | | | | | | |
| C. glacial acetic acid | | | | | | | | | |
| Mixtures available from Ethox Chemical Inc. | | | | | | | | | |
| "1369" 64% A, 25.4% B, 10.4% C | 200/.53 | 200/.52 | 200/.51 | 100/.26 | 50/.13 | 200/.50 | 100/.25 | — | — |
| "1566" < 64% A, > 25.4% B, 10.4% C | — | — | — | — | — | — | — | 200/.50 | — |
| "1567" < 64% A, > 25.4% B, 10.4% C | — | — | — | — | — | — | — | — | 200/.50 |
| Starch | | | | | | | | | |
| MiraQuik C (hybrid corn starch) | — | — | — | — | — | — | — | 837/2.1 | 837/2.1 |
| Cato-75 (cationic corn starch) | 500/1.3 | — | — | — | — | — | — | — | — |
| Nadex-339 (dextrine corn starch) | — | — | — | 1000/2.5 | 1000/2.5 | 1000/2.5 | 1000/2.5 | — | — |
| Nabond [National starch] | — | — | — | — | — | — | — | 837/2.1 | 837/2.1 |
| Polyvinyl alcohol (Gelvatol 1.30) | — | — | 500/1.3 | 500/1.3 | — | — | — | — | — |
| Gelatin | — | — | 500/1.3 | 500/1.3 | — | — | — | — | — |
| Polyethylene glycol (60%) | — | — | — | — | 833/2.1 | 833/2.1 | 833/2.1 | 203/.50 | 203/.50 |

TABLE 1-continued

| | Treatment Formulations Formulations in 37.85 liters of H₂O | | | | | | | | |
|---|---|---|---|---|---|---|---|---|---|
| Components | 1 gm/wt % | 2 gm/wt % | 3 gm/wt % | 4 gm/wt % | 5 gm/wt % | 6 gm/wt % | 7 gm/wt % | 8 gm/wt % | 9 gm/wt % |
| Soybean oil (lubricant) | — | — | — | — | — | — | — | 373/.90 | 373/.90 |
| Organo tin oxide | — | — | .3ml | .3ml | .3ml | .3ml | .3ml | .38ml | .38ml |
| Emulsifier (Polyoxyethylene (5) sorbitan monoleate) "Tween 81" | — | — | — | — | — | — | — | 81/.2 | 81/.2 |
| Wetting agent (Octylphenoxypoly ethyleneoxy ethanol) | — | — | — | — | — | — | — | 15ml | 15ml |
| Solids | .37 | 1.72 | 3.06 | 2.81 | 3.94 | 4.45 | 4.16 | 6.22 | 6.59 |
| pH | 7.3 | 7.15 | 6.88 | 6.55 | 6.4 | 7.1 | 6.9 | 7.79 | 7.55 |
| Viscosity (centipoise room temp.) | 6.5 | 8.0 | 9.5 | 8.5 | 6.0 | 6.0 | 7.5 | 164.5 (at 125° F.) | 125 (at 151° F.) |

Formulation Number 1 of Table I was used to treat glass fibers where the glass fibers were in a wet chopped construction. The formulation of the mixture in 37.85 liters of water gave a binder solids of 0.37 and a pH of 7.3 with a viscosity of 65 centipoise at room temperature. This aqueous solution was applied to the glass fibers during forming for producing wet chopped glass fibers. The glass fibers were the "621" glass fiber type although the glass fibers could be made from "E-glass" or non-polluting modifications of the "621" or "glass" composition or alkali resistant type glass composition or "A-glass" compositions. The treatment formulation of Formulation Number 1 was applied to individual glass fibers as they were drawn from orifices in an electrically heated, platinum alloy or ceramic bushing containing molten glass to form glass fibers. The glass fibers treated with the Formulation Number 1 had a diameter of around 60 to $65 \times 10^{-5}$ inches, commonly referred to as M fibers. The formulation was applied to the fibers prior to the time they were passed through a chopping apparatus by means of a roller applicator which is partially submerged in the treatment formulation contained in a reservoir. Such an applicator is shown in more detail in U.S. Pat. No. 2,728,972. The wet chopped treated glass fibers were then collected and tested. They were shown to have good wet-out and to have good dispersion characteristics in aqueous solution.

Formulation Number 2 of Table I was applied to glass fibers in a similar manner to that of Formulation Number 1 to form wet chopped glass fiber strands. The treating formulation had a solids content of 1.72 and a pH of 7.15 and a viscosity of 8.07 centipoise at room temperature. The formulation was applied to M fibers and the treated fibers had good sleeve wet-out and good dispersion characteristics in water.

Formulations 3-9 were applied to glass fiber strands that were produced in a dry condition. Here the formulation was applied to the individual glass fibers as they are drawn from orifices in an electrically heated, platinum alloy or ceraminc bushing containing molten glass to form glass fibers. The treatment formulation was applied to the fibers prior to the time they were grouped together to form a strand containing many fibers usually around 400, by means of roller applicator which is partially submerged in the treatment formulation contained in a reservoir. The fibers were then grouped into a strand or strands by a gathering shoe and wound onto forming packages rotating at speeds around 4400 rpm to produce a strand travel speed of around 14,000 fpm. Other methods of applying treatment formulation to the strand of glass fibers, such as pad applicators, may be employed as the strand may be formed by means other than winding on the forming tube such as by means of a pair of rotating wheel pullers which direct the strand to suitable collecting devices. The glass fiber strands wound on the forming package were then dried. The drying operation may be done in any number of known methods sufficient to reduce the moisture level to that appropriate for further processing.

The glass fiber strands treated with Formulations 3-9 varied in construction. Strands treated by treatment formulations 3, 4, 5, 6, 8 and 9 were of a diameter of around $25 \times 10^{-5}$ inches, whereas the treatment formulation number 7 was applied to G type glass fibers having a fiber diameter of around 35 to $40 \times 10^{-5}$ inches.

Treatment formulations 3-9 had characteristics shown in Table I of binder solids, pH and viscosity and produced treated glass fibers with good sleeve wet-out and good dispersion characteristics in aqueous solution, with treating formulations 3 and 4, 5, 6, 7 yielding excellent dispersion characteristics for the treated glass fibers in aqueous solution.

The foregoing has described a treating formulation for glass fibers to make glass fibers more dispersible in aqueous solution especially in the production of sheet-like glass fiber products, like glass paper. The treating formulation can be applied to the glass fibers during forming if the treated glass fibers are to be in a wet condition or the treating formulation can be a component of a particular sizing composition and applied to glass fibers during their formation into glass fiber strand that is subsequently dried and chopped. In addition, the treating formulation or mixture can be added directly to the water in which the glass fibers are to be dispersed. The treating formulation is a mixture of phosphate esters of polyoxylalkylene alkyl alcohols and polyamine compounds and an organic acid. When used in a sizing composition, the mixture is used along with a starch or polyvinyl alcohol film-former and may contain other ingredients such as gelatin, bactericide, lubricants such as soybean oil or polyethylene glycol and emulsifiers.

The foregoing has also described the process wherein the treating formulation of the mixture of phosphate ester of polyoxyalkylene alkyl alcohol, polyamine compounds and organic acid is added directly to the aqueous solution in which the glass fibers are to be dispersed before the addition of the glass fibers. The glass fibers are then added to the aqueous solution containing the treating formulation to form an aqueous dispersion of glass fibers. The dispersion is then conveyed to an apparatus to remove the glass fibers to form a sheet-like glass fiber product and the dispersion is recycled to disperse a fresh batch of glass fibers. The aqueous dispersion can be recycled for reuse with glass fibers for around 20 complete cycles.

The treating formulation does not detract from the wet strength of the glass fibers and provides a retarding effect to reagglomeration of glass fibers once they are dispersed in aqueous solution. This effect is believed to be produced by the ratio of the phosphate to the amine groups in the mixture where the polyamine is used to form the cationic charge by a substitution reaction forming a quaternary reaction product.

I claim:

1. An aqueous treating formulation for glass fibers to improve the dispersibility of glass fibers in aqueous solution, comprising:
    (a) phosphate esters of polyoxyethylene alkyl alcohol in an amount of at least about 45 percent by weight of the nonaqueous constituents,
    (b) polyamine compound having at least three active amine hydrogens per molecule in an amount in the range of about 5 to about 45 weight percent of the nonaqueous constituents,
    (c) a small amount of carboxylic acid, and
    (d) water in an amount sufficient to solubilize the alcohol, polyamine, and carboxylic acid.

2. Treating formulation of claim 1 wherein the phosphate ester of polyoxyethylene alkyl alcohol is a mixture of mono and diphosphate esters of polyoxyethylene decyl (6) alcohol.

3. The treating formulation of claim 1, wherein the polyamine is selected from the group consisting of diamines having the formula; $H_2N-(CH_2)_n-NH_2$ wherein n is an integer from about 2 to 10, triamines, tetramines, pentamines, and hexamines.

4. The aqueous treating formulation of claim 1 or claim 3, wherein the polyamine is tetraethylenepentamine.

5. The aqueous treating formulation of claim 1, wherein the small amount of carboxylic acid is present in an amount of about 1 to about 20 weight percent of the mixture on a non-aqueous basis.

6. The aqueous treating formulation of claims 1 or 5, wherein the carboxylic acid is acetic acid.

7. The aqueous treating formulation of claim 1, additionally containing a film-former selected from the group consisting of starch, polyvinyl alcohol, and gelatin.

8. The aqueous treating formulation of claim 1 or claim 7 which includes a lubricant.

9. An aqueous sizing composition for glass fibers to produce glass fibers with improved dispersibility in aqueous solution, comprising:
    (a) 0.1 to 1.5 percent of the aqueous composition of an amount of a mixture comprising:
        i at least about 45 weight percent of the mixture of phosphate esters of polyoxyethylene alkyl alcohol,
        ii about 5 to about 45 weight percent of the mixture of a polyamine compound having at least three active amine hydrogens per molecule,
        iii about 1 to about 20 weight percent of the mixture of an organic acid,
    (b) about 1 to about 10 weight percent of the aqueous sizing composition of a film-former selected from the group consisting of starch, polyvinyl alcohol or gelatin, and
    (c) about 9 to about 99 weight percent water.

10. Sizing composition of claim 9 having present a lubricant in an amount in the range of about 0.1 to about 3 weight percent of the sizing composition.

11. Sizing composition of claims 9 or 10 having present polyethylene glycol in an amount of about 0.1 to about 3 weight percent of the sizing composition.

12. Sizing composition according to claims 9 or 11 having present an emulsifier in an amount of about 0.05 to 0.5 weight percent of the sizing composition.

13. Sizing composition of claims 9 or 12 having present an organo tin bactericide in an amount of about 0.01 to about 10 milliliters.

14. The sizing composition according to claims 9 or 13 having present a wetting agent in an amount of about 1 to about 50 milliliters.

15. The aqueous sizing composition of claim 9 wherein the polyamine is selected from the group consisting of diamines having the formula; $H_2N-(CH_2)_n-(NH_2$ wherein n is an integer from about 2 to 10, triamines, tetramines, pentamines, and hexamines.

* * * * *

UNITED STATES PATENT AND TRADEMARK OFFICE
CERTIFICATE OF CORRECTION

PATENT NO. : 4,330,337
DATED : May 18, 1982
INVENTOR(S) : Roy R. Graham

It is certified that error appears in the above-identified patent and that said Letters Patent are hereby corrected as shown below:

Column 4, line 14, delete "zylylene", and insert therefor, --xylylene--.

Column 7, line 56, insert a closed parentheses ")" after

--"161"--.

Column 9, line 56, delete "ceraminc", and insert therefor, --ceramic--.

Column 12, line 43, formula $H_2N-(CH_2)_n-(NH_2$ should read

--$H_2N-(CH_2)_n-NH_2$--.

Signed and Sealed this

Third Day of May 1983

[SEAL]

Attest:

GERALD J. MOSSINGHOFF

Attesting Officer       Commissioner of Patents and Trademarks